(12) United States Patent
Ponikiewski et al.

(10) Patent No.: US 12,233,973 B2
(45) Date of Patent: Feb. 25, 2025

(54) STEER BY WIRE STEERING COLUMN ASSEMBLY

(71) Applicant: ZF Steering Systems Poland Sp. Z.o.o., Czechowice-Dziedzice (PL)

(72) Inventors: Pawel Ponikiewski, Pewel Mala (PL); Damian Uchyla, Strumień (PL); Artur Wojtalik, Katowice (PL); Radoslaw Szymoszek, Cieszyn (PL); Marcin Brzoska, Zabrzeg (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 18/326,249

(22) Filed: May 31, 2023

(65) Prior Publication Data
US 2024/0001985 A1    Jan. 4, 2024

(30) Foreign Application Priority Data

Jun. 1, 2022 (EP) .................................. 22461560
Sep. 12, 2022 (GB) .................................. 2213274

(51) Int. Cl.
*B62D 6/00* (2006.01)
*B62D 1/181* (2006.01)
*B62D 1/185* (2006.01)

(52) U.S. Cl.
CPC ............ *B62D 6/008* (2013.01); *B62D 1/181* (2013.01); *B62D 1/185* (2013.01)

(58) Field of Classification Search
CPC ........ B62D 6/008; B62D 1/181; B62D 1/185; B62D 5/006; B62D 1/187; B62D 1/16; B62D 5/0403; B62D 5/0409
See application file for complete search history.

(56) References Cited

U.S. PATENT DOCUMENTS

| | | | | |
|---|---|---|---|---|
| 6,799,654 B2 * | 10/2004 | Menjak | .................. | B62D 5/006 |
| | | | | 180/402 |
| 2007/0262576 A1 | 11/2007 | Tomaru et al. | | |

(Continued)

FOREIGN PATENT DOCUMENTS

| CN | 116080744 A * | 5/2023 | ............. B62D 1/181 |
|---|---|---|---|
| DE | 102021204136 B3 | 4/2022 | |

(Continued)

*Primary Examiner* — Drew J Brown
(74) *Attorney, Agent, or Firm* — Kristin L. Murphy

(57) ABSTRACT

A steer by wire steering column assembly for a vehicle comprises a shroud having a first shroud portion and a second shroud portion, the two shroud portions being constrained to move telescopically relative to one another for adjustment of a reach position of the steering column assembly; a shaft supported by one or more bearing assemblies housed within the shroud and adapted for supporting a handwheel or another user operable device at a free end; and a linear actuator that includes an elongate threaded rod that is connected at a first location to one of the shroud portions by a first bracket assembly and at a second location to the other shroud portion by a second bracket assembly, the linear actuator controlling the telescopic position of the shroud by causing the threaded rod to rotate around its axis. At least one of the bracket assemblies is adapted to provide a degree of lost motion between the linear actuator and the associated shroud portion that accommodates misalignment of the two shroud portions during use of the steering column assembly that would otherwise apply a bending moment to the linear actuator.

19 Claims, 13 Drawing Sheets

(56) References Cited

U.S. PATENT DOCUMENTS

| | | | |
|---|---|---|---|
| 2018/0273080 A1* | 9/2018 | Martinez | B62D 1/181 |
| 2019/0016364 A1 | 1/2019 | Palmer et al. | |
| 2023/0043788 A1* | 2/2023 | Ponikiewski | B62D 1/185 |

FOREIGN PATENT DOCUMENTS

| | | | | |
|---|---|---|---|---|
| JP | 2006315529 A | | 11/2006 | |
| WO | WO-03078234 A1 * | | 9/2003 | B62D 1/181 |
| WO | WO-2017059422 A1 * | | 4/2017 | B62D 1/181 |

* cited by examiner

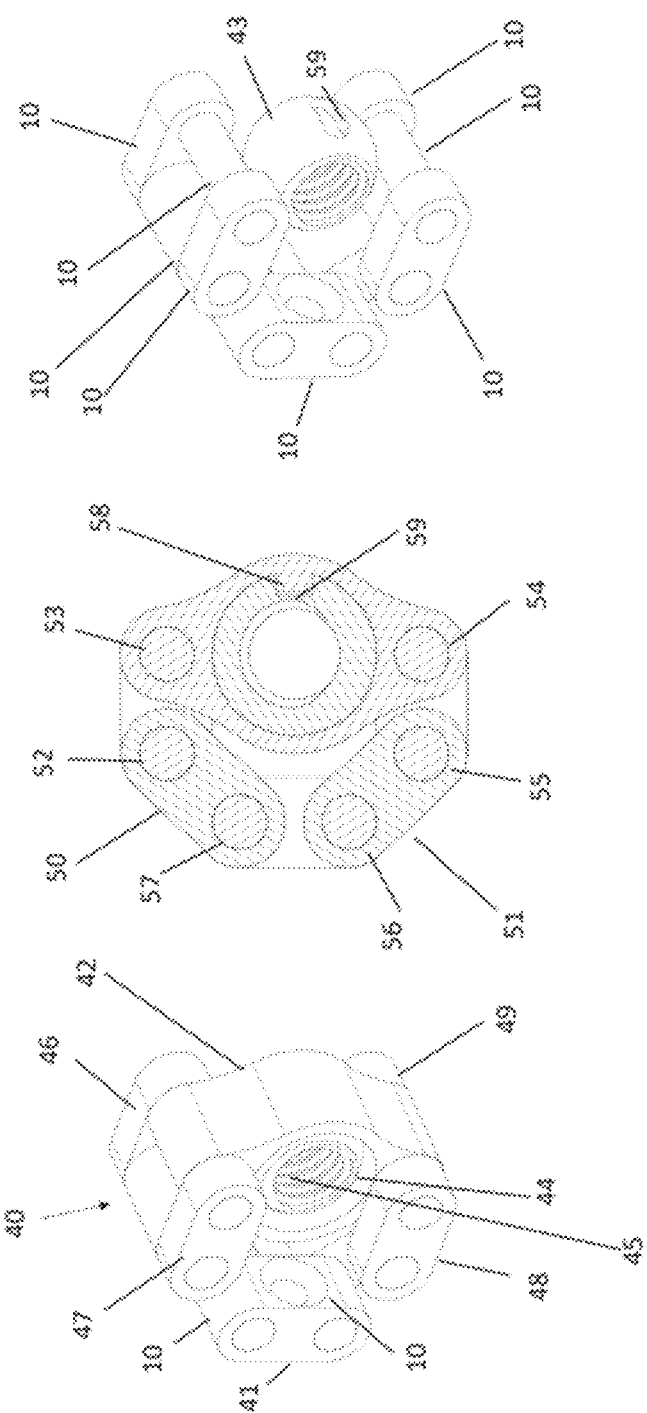

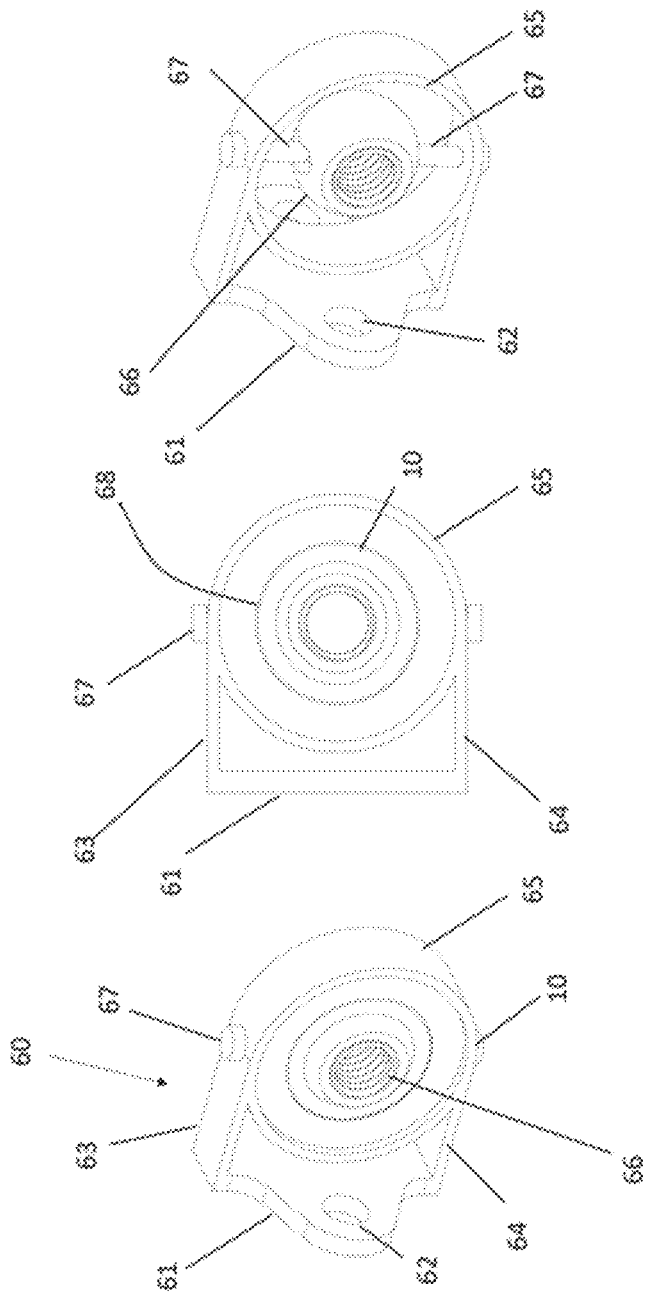

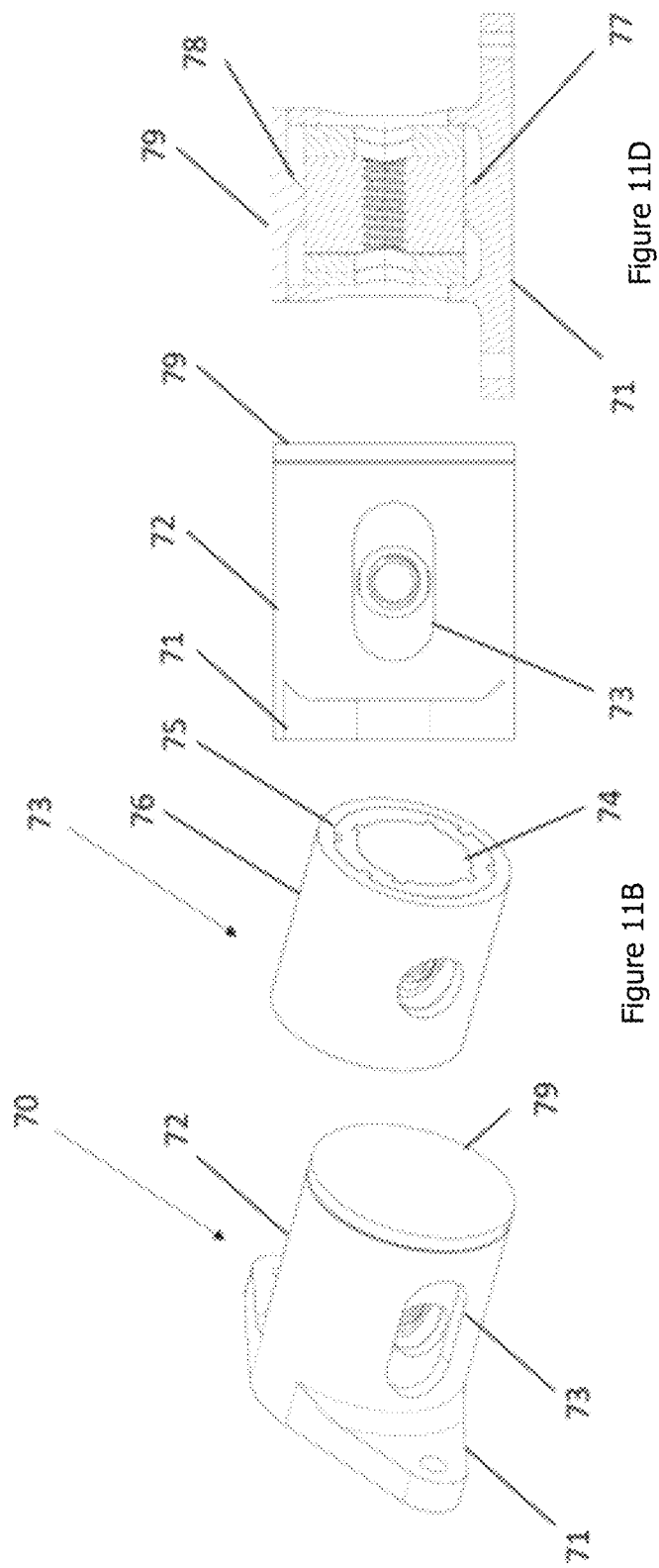

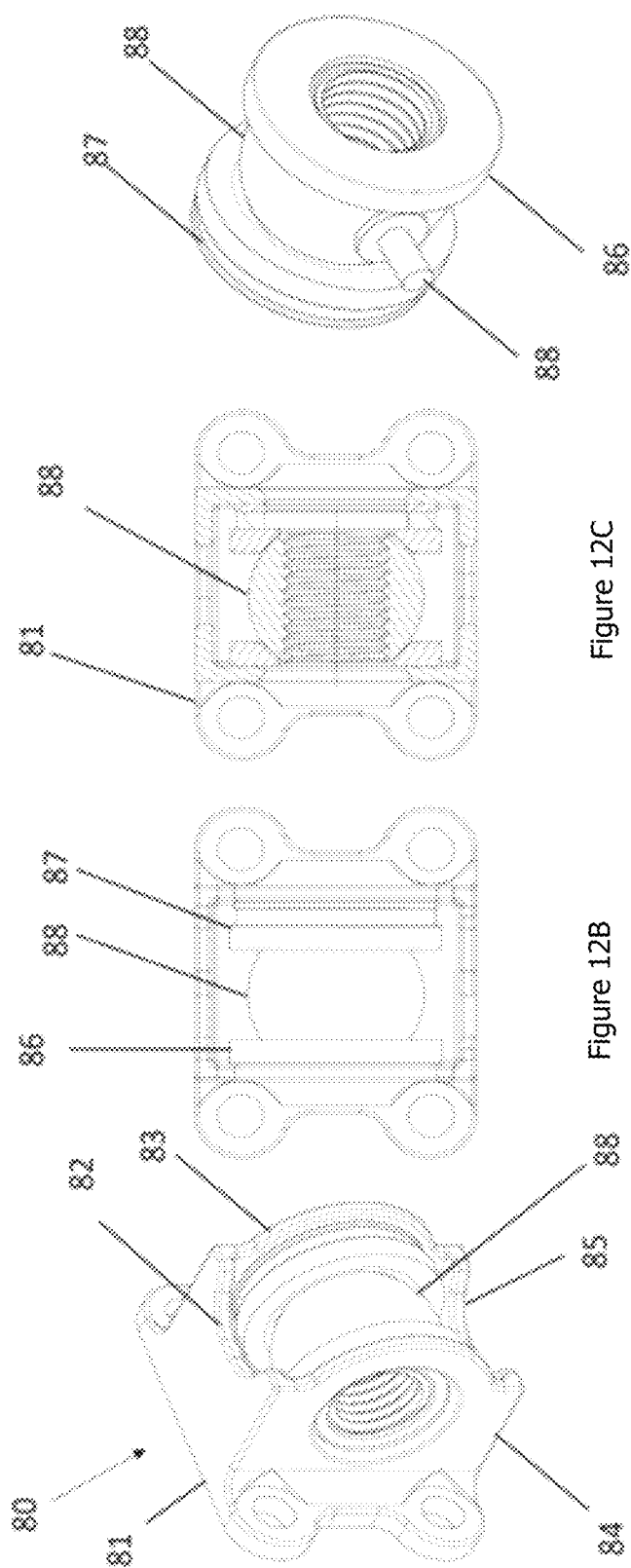

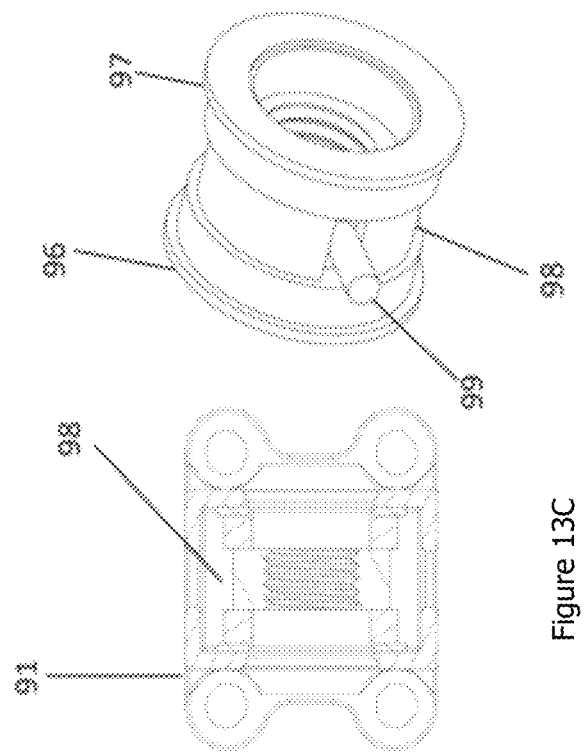
Figure 13D
Figure 13C
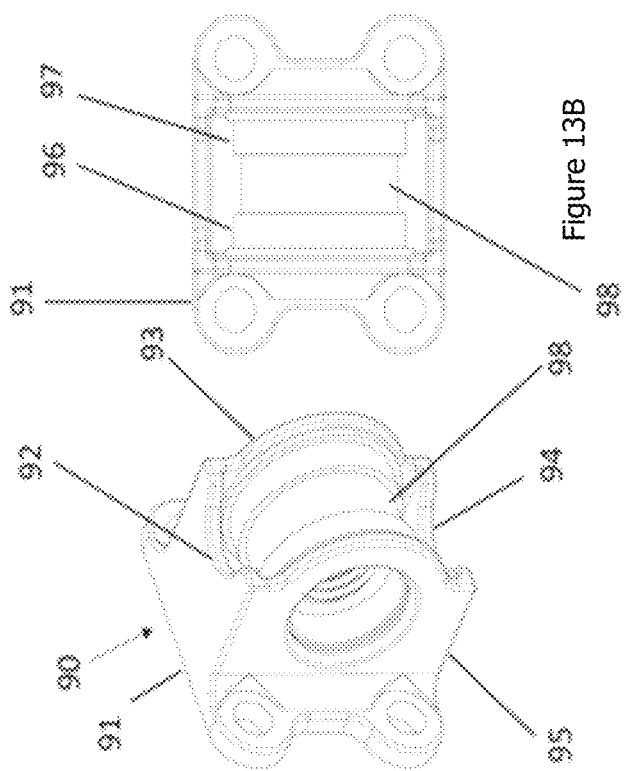
Figure 13B
Figure 13A

STEER BY WIRE STEERING COLUMN ASSEMBLY

CROSS-REFERENCE TO RELATED APPLICATION

This application claims priority to UK Patent Application No. 22461560.9, filed Jun. 1, 2022 and GB Patent Application No. 2213274.0, filed Sep. 12, 2022, the disclosure of which is incorporated herein by reference in its entirety.

TECHNICAL FIELD

This disclosure relates to retractable steer-by-wire steering columns.

BACKGROUND

In a steer-by-wire steering system, a steering wheel (or other driver-operated steering member such as a tiller or yoke) is attached to one end of an elongate steering shaft. The shaft is in turn supported by a steering shroud using one or more bearings so that the shaft and in turn the steering wheel may rotate. The shroud fixes the position of the steering wheel within the vehicle. The angular displacement of the steering shaft is measured to generate an electrical signal which is used to control the orientation of the steered wheels of the vehicle. In a steer-by-wire steering system, there is no physical connection between the steering wheel and the steered wheels, and so normally the steering shaft is also connected via gearing to an electric motor (known as a torque feedback unit) which applies a torque to the steering column in the opposite direction to the torque applied by the driver, to provide a sensation of "road feel" to the driver.

The steering shaft, shroud, motor, and associated sensors together form a unit that is known in the art as a steer-by-wire handwheel actuator (HWA). FIG. 1 shows the overall layout of a generalised steer-by-wire system including an HWA. The HWA 1 supports a drivers steering wheel 2 and measures a driver demand 3 which is usually a steering angle. A steering controller 4 converts the driver demand 3 into a position demand 5 that is sent to a front axle actuator (FFA) 6. The FFA 6 controls the steering angle of connected roadwheels 7 to achieve the position demand. The FAA 6 can feedback operating states and measurements to the steering controller 4. The steering controller 4 combines the FAA feedback with other information measured in the vehicle, such as lateral acceleration, to determine a target feedback torque that should be sensed by the driver, i.e., a feed back demand 8. This feedback demand 8 is then sent to the HWA 1 and force feedback, typically opposing the driver applied force, is provided by controlling the motor or motors of the HWA 1.

This description shows a physically separate steering controller; in practice, different architectures may be used to achieve the same result. The functions of the steering controller may either be physically implemented in the HWA, the FAA, or another control unit in the vehicle, or some combination of all 3. Alternatively, the control functions ascribed to the HWA and FAA may be partially or totally implemented in the steering controller.

Autonomous vehicles are intended to be used in an autonomous mode in which the driver does not need to steer the vehicle. As such, a fully autonomous vehicle could be produced that does not have an HWA at all. However, it is desirable to provide an HWA for the driver to use in situations where they wish to, or may be required to, manually steer the vehicle. For convenience, the handwheel may be retracted into a dashboard when it is not required and move telescopically out to the driver when manual steering is required. In cases where this functionality is not provided, there remains a need for the handwheel to retract away from the driver in the event of a crash. Lastly, it is desirable to provide a range of reach positions for the hand wheel to suit a desired driving position of a wide range of drivers of different sizes.

It is known to provide an HWA that includes a steering column which has a telescopic steering mechanism comprising at least two tubular members that are coaxially arranged and that house a shaft for attachment to a steering wheel or yoke. An electrically powered linear actuator is fixed at one point to the first tubular member and at second point to the second tubular member. A controller causes the actuator to vary the relative longitudinal positions of the two tubular members. An arrangement of this kind is known from the applicants earlier patent application GB 2579372A and is illustrated in FIG. 2 of the accompanying drawings.

As shown in FIG. 2, the steering column 10 of a HWA comprises three tubular shroud portions, nested together so that the overall length of the shroud can be adjusted telescopically. A first tubular shroud portion 20 is located nearest the steering wheel of the handwheel actuator and has an external diameter sized to slide within a bore of a second tubular shroud portion 30. This second shroud portion in turn slides within a bore of a third tubular shroud portion located furthest from the steering wheel. The first shroud portion supports a steering shaft by a pair of bearing assemblies (not shown) such that the shaft can rotate. An end of the shaft protrudes from the first shroud portion and carries a set of splines that can mate with corresponding splines of a steering wheel.

To control movement of the three shroud parts, the first and second carry fixing brackets that have a threaded central bore. A shaft that has a complimentary thread is fitted to the two brackets with the handing of the thread along the shaft being chosen such that rotation of the shaft draws the two brackets towards or away from each other and hence alters the overall length of the shroud. The shaft and the threaded brackets form a linear actuator mechanism. Various modifications are possible, for instance replacing the threaded bore of the brackets with a ball screw drive type of interface where ball bearings interconnect the threads of the shaft and the bracket.

The rotation of the shaft is controlled by a motor that is secured to the second shroud portion, located towards the middle of the shaft. As shown the motor is offset from the shaft the rotor of the motor carries a worm gear and drives the shaft through a wheel gear secured to the shaft within a protective casing.

In other arrangements the motor may be fixed to the first shroud portion of the third shroud portion, with a threaded bracket fixed to the second shroud portion.

An aim of the present disclosure is to ameliorate problems that may present themselves in an HWA that is retractable using a screw drive assembly that arise due to tolerances in the various parts of the column causing excess friction or even binding of the shroud.

SUMMARY

According to a first exemplary arrangement, a steer by wire steering column assembly for a vehicle comprises:
a shroud having a first shroud portion and a second shroud portion, the first and second shroud portions being constrained to move telescopically relative to one another for adjustment of a reach position of the steering column assembly;

a shaft supported by one or more bearing assemblies housed within the shroud and adapted for supporting a handwheel or another user operable device at a free end, and a linear actuator that includes an elongate threaded rod that is connected at a first location to one of the shroud portions by a first bracket assembly and at a second location to the other shroud portion by a second bracket assembly, the linear actuator controlling the telescopic position of the shroud by causing the threaded rod to rotate around its axis, wherein at least one of the bracket assemblies is adapted to provide a degree of lost motion between the linear actuator and the associated tubular member that accommodates misalignment of the two shroud portions during use of the steering column assembly that would otherwise apply a bending moment to the linear actuator.

The applicant has appreciated that due to tolerances in components the two shroud portions may on telescopic adjustment move away from the ideal linear movement that would be parallel to the linear motion of the linear actuator. If the linear actuator is rigidly connected to the two tubular portions this may cause the actuator to bend. This will introduce additional friction to the linear actuator which may increase the power consumption, cause unwanted noise and in an extreme case cause the linear actuator to lock up. By providing for brackets that mount the linear actuator that allow for some lost motion the column assembly the bending load on the linear actuator can be reduced or even totally removed.

Each shroud portion may comprise a tubular member, for instance a cast or extruded component.

Each of the bracket assemblies may be arranged such that only a very low resistance to movement of the linear actuator relative to the associated shroud portion along the undesirable directions is present to ensure a smooth adjustment of position as the steering column assembly moves in and out without placing undue strain on the linear actuator.

The first bracket assembly may be arranged to provide free movement with little to no opposing force of the part of the linear actuator in one or more and in one exemplary arrangement, all the following directions:

Horizontally
Vertically
Rotationally around the horizontal axis
Rotationally around the vertical axis.

Each support bracket assembly may provide the lost motion through a relative sliding of one part of the support bracket relative to another.

Each support bracket assembly may comprise a rigid mounting part that is fixed to the associated shroud portion and a locating part that is fixed to the mounting part and that engages the elongate rod.

The lost motion may be provided between the mounting bracket and the shroud portion, or the locating part and the mounting bracket, or both.

The rigid mounting part of the support bracket assembly may be secured to the associated shroud part through a fastener that extends through an elongate slot in the rigid mounting part that allows the rigid mounting part to move vertically relative to the shroud. For example, the rigid mounting part may include a base plate that sits upon a complimentary vertical receiving surface of the side of the associated shroud portion such that the base plate may slide relative to the receiving surface. This allows any unwanted vertical offset of the shrouds due to manufacturing tolerances to be accommodated without placing a bending load on the rod of the linear actuator.

The locating part of the support bracket assembly may comprise a cage that is secured to the rigid mounting part and a connector block that is retained within the cage and which engages the rod of the linear actuator, the cage permitting limited translation or rotation of the connector block relative to the cage.

The lost motion may be provided between the cage and the mounting bracket, or the cage and the connector block, or both.

The connector block may include a through bore that receives the rod of the linear actuator. This may have an internal thread that engages a thread of the rod.

The cage may restrain the connector block such that it cannot rotate around the axis of rotation of the rod. Thus, as the rod rotates the block does not which enables the length of the shroud to be adjusted. A pin may be provided that links the connector block to the cage or to another part of the rigid mounting part to prevent that rotational movement.

Where a pin is provided, the connector block may be free to slide along the pin over a limited range of motion.

The connector block may be free to slide in a generally horizontal direction through a limited range of motion within the cage. This arrangement ensures that the horizontal misalignment of the shroud portions due to manufacturing tolerances does not apply a bending load to the rod of the linear actuator.

The connector block may also be free to rotate within the cage around an axis perpendicular to the axis of the rod. It may rotate around two such mutually orthogonal axes.

The connector block may be generally spherical or a generally cylindrical.

Where the connector block comprises a cylinder the axis of rotation of the cylinder may be parallel to or orthogonal to the axis of rotation of the rod of the linear actuator.

The cage may comprise a cylinder having a central bore that locates the connector block. Where the block is a ball the outer diameter of the ball may be complimentary to the inner diameter of the cylinder, the cylinder being slightly oversized to ensure the rotation of the ball is permitted in the cylinder. The cylinder may include openings through which the rod of the linear actuator can pass that are in turn oversized such that the openings limit the range of motion of the ball within the cylinder.

In an alternative arrangement, the cage may comprise a component that has a part spherical inner surface that is complimentary to an outer surface of the connector block.

The connector block may be slidingly fixed to the cage through one or more plain bearings. Additionally, one or more springs may be provided that bias the connector block into a neutral position within the cage.

The cage may be rigidly secured to the rigid mounting part and the two may be a single unitary component. For instance, the two parts together may comprise a cylinder and a base plate that extends across one end of the cylinder.

The cage may be secured to the rigid mounting part through at least a linkage that permits relative motion between the cage and the mounting part.

The linkage may comprise two link arms that are arranged as a parallelogram enabling the cage to move vertically up and down relative to the rigid mounting part.

At least one damping element may be provided that acts between the cage and the connector block to damp motion between the two parts and to provide some self-centring.

The damper may comprise an elastic sleeve.

The linear actuator may comprise a motor that has a worm gear on an output shaft and is connected to the rod of the linear actuator through a wheel gear.

In an exemplary arrangement, the shroud comprises additionally a third shroud portion that is located intermediate the first and second shroud portion and the motor is secured to the third shroud portion, the two bracket assemblies being connected respectively to an associated one of the other two shroud portions.

Each of the connector blocks of the two bracket assemblies may nominally lie on a common axis, a feature that is maintained during use due to the lost motion function of the mounts.

According to a second aspect, the disclosure provides a handwheel actuator assembly comprising a column assembly according to the first aspect that includes a motor that is connected to the steering shaft through a gearbox to provide force feedback to the user through the steering shaft.

The handwheel actuator assembly may include an electronic control and drive circuit that controls and drives the electric motor in response to a force feedback demand signal.

The handwheel actuator may include an angular position sensor that determines the angular position of the steering shaft relative to the first shroud portion.

BRIEF DESCRIPTION OF THE DRAWINGS

There will now be described, by way of example only, several exemplary arrangements of the present disclosure with reference to the accompanying drawings of which:

FIG. 9A is an isometric view of the internal parts of a second exemplary support bracket that may be used in the handwheel actuator of FIG. 4;

FIG. 9B is a frontal view looking along the axis of the rod of the linear actuator of the internal parts of a secondary exemplary support bracket that may be used in the handwheel actuator of FIG. 4;

FIG. 9C is a cut away view of the internal parts of a secondary exemplary support bracket that may be used in the handwheel actuator of FIG. 4;

FIG. 10A is an isometric view of the internal parts of a third exemplary support bracket that may be used in the handwheel actuator of FIG. 4;

FIG. 10B is a frontal view looking along the axis of the rod of the linear actuator of the internal parts of a third exemplary support bracket that may be used in the handwheel actuator of FIG. 4;

FIG. 10C is a cut away view of the internal parts of a third exemplary support bracket that may be used in the handwheel actuator of FIG. 4;

FIG. 11A is an isometric view of a third exemplary support bracket that may be used in the handwheel actuator of FIG. 4;

FIG. 11B is a view of an internal sleeve and connector block of the third exemplary support bracket that may be used in the handwheel actuator of FIG. 4;

FIG. 11C is a frontal view looking along the axis of the rod of the linear actuator of the third exemplary support bracket that may be used in the handwheel actuator of FIG. 4;

FIG. 11D is a cross-sectional view along a line connecting the two fixing holes of the base plate of the third exemplary support bracket that may be used in the handwheel actuator of FIG. 4;

FIG. 12A is an isometric view of a fifth exemplary support bracket that may be used in the handwheel actuator of FIG. 4;

FIG. 12B is a side view of the fifth exemplary support bracket that may be used in the handwheel actuator of FIG. 4;

FIG. 12C is a cross-sectional view along a vertical plane passing through the axis of the elongate rod;

FIG. 12D is a view of the internal parts of the fifth exemplary support bracket that may be used in the handwheel actuator of FIG. 4;

FIG. 13A is an isometric view of a sixth exemplary support bracket that may be used in the handwheel actuator of FIG. 4;

FIG. 13B is a side view of the sixth exemplary support bracket that may be used in the handwheel actuator of FIG. 4;

FIG. 13C is a cross-sectional view along a vertical plane passing through the axis of the elongate rod of the sixth exemplary support bracket that may be used in the handwheel of FIG. 4; and FIG. 13D is a view of the internal parts of the sixth exemplary support bracket that may be used in the handwheel of FIG. 4.

DETAILED DESCRIPTION

Figure 1:
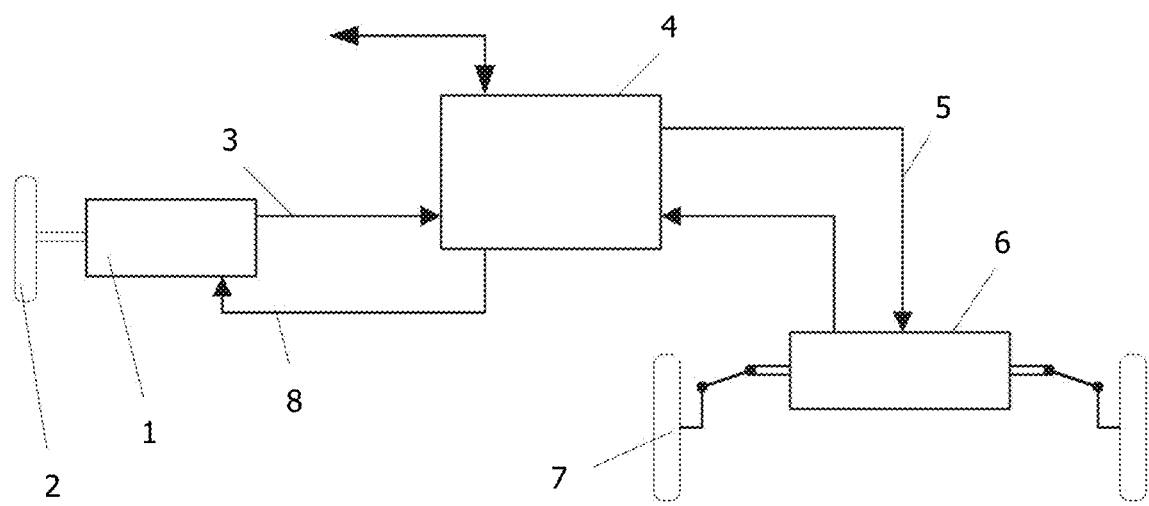
FIG. 1 is a schematic of a steer by wire system of a vehicle that includes a handwheel actuator assembly.
Figure 2:
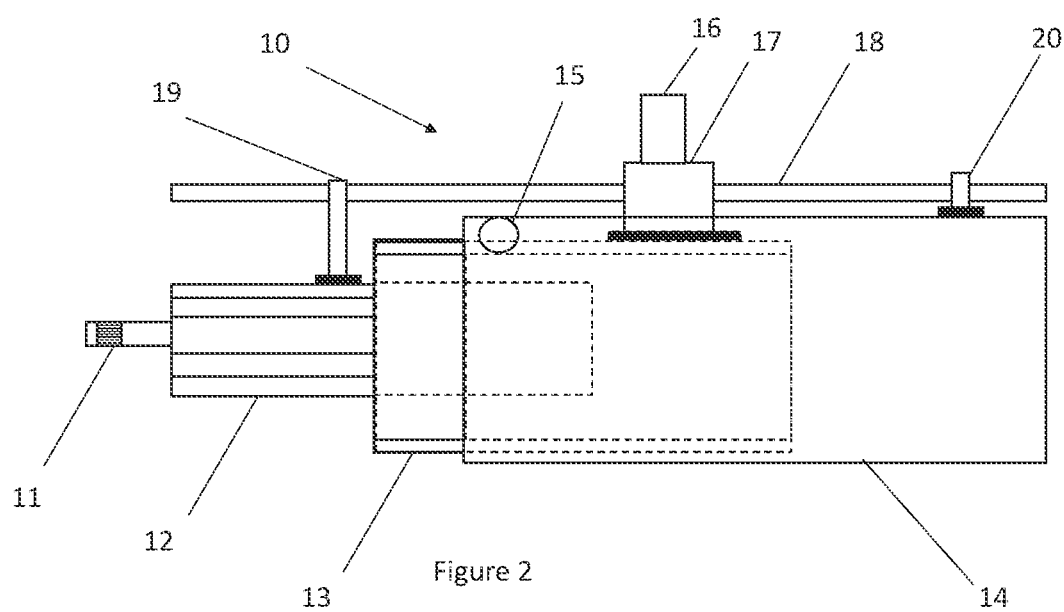
FIG. 2 is a cross sectional view of a handwheel actuator for use in a system of FIG. 1.
Figure 3:
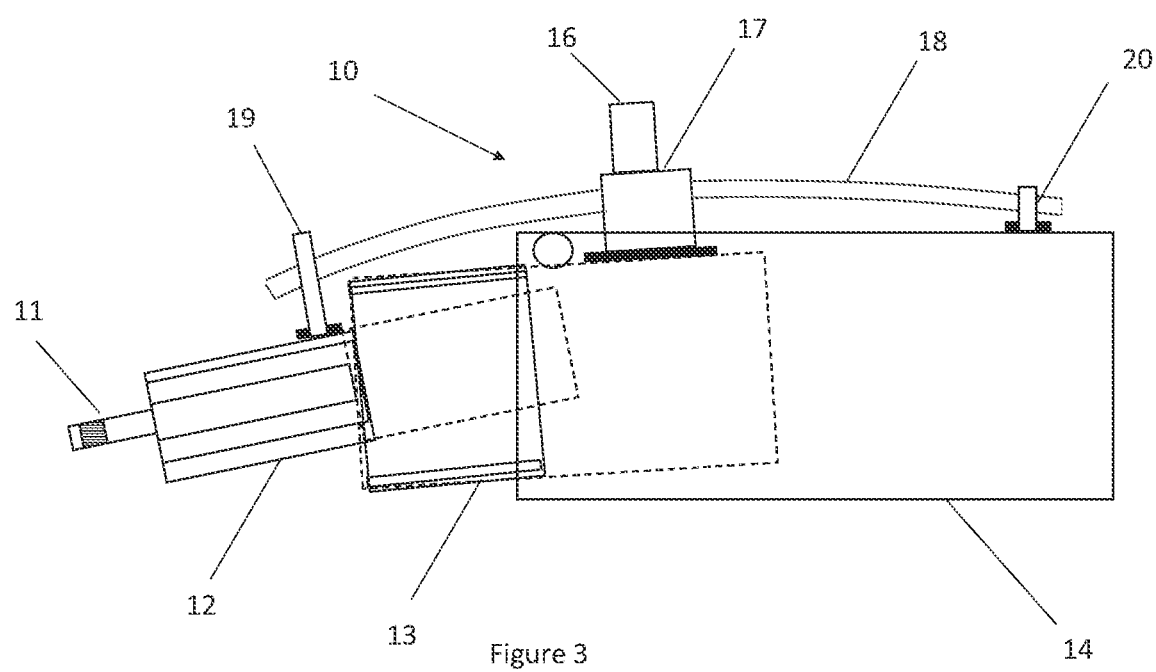
FIG. 3 is a view of the handwheel actuator of FIG. 2 when fully extended showing how a bending force may be applied to the rod of the linear actuator.
Figure 4:
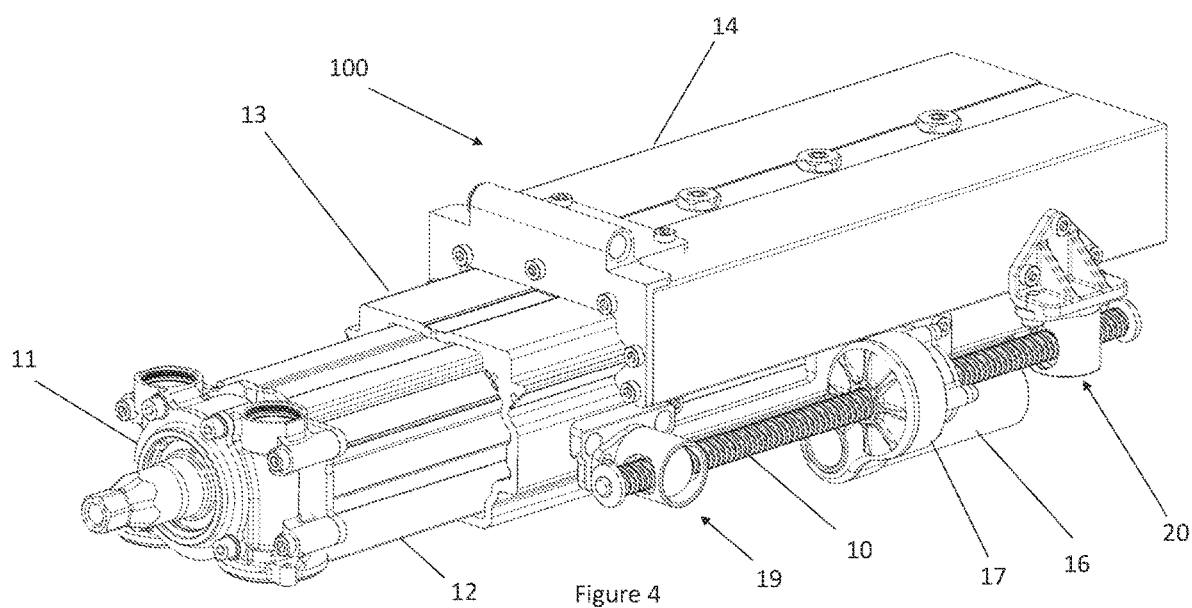
FIG. 4 is an isometric view of a handwheel actuator assembly according to the present disclosure.

As shown in FIG. 4, a handwheel actuator 10 comprises a three-part telescopic shroud. The function of the shroud is to support a steering shaft 11 in a desired position relative to a vehicle body (not shown). By providing three shroud portions, the range of length adjustment of the shroud is large relative to its fully retracted position making it an excellent choice for a vehicle where the wheel may be presented to a user for use in a manual driving mode or retracted into a dashboard to free up space in a fully autonomous driving mode. Within these extremes the shroud also permits a choice or reach positions for the steering wheel to suit drivers of different shapes and sizes.

The three-part telescopic shroud comprises three tubular members, each an extrusion having a generally square outer cross section through its long axis. The three shroud portions having increasing sizes moving from the first one nearest the driver and the third one furthest from the driver. A first portion 12 supports the steering shaft 11 that in turn may be fixed to a steering wheel or yoke. This is telescopically received in a second portion 13 which is itself telescopically received in a third portion 14. The third portion includes a fixing hole 15 that allows the shroud to be secured to a fixed part of the vehicle such as a cross member extending behind a vehicle dashboard by a pivot pin. The pivot pin allows for the whole shroud to rotate to provide rake adjustment of the steering wheel or yoke.

The first tubular member 12 is a sliding fit within an inner bore of the second tubular member 13, the two being constrained to move telescopically relative to one another for adjustment of the reach position of the steering column assembly. The second tubular member 13 is in turn a sliding fit within a bore of the third tubular member 14. A set of interengaged grooves and rails on the shroud portions facilitate accurate linear movement of the shroud portions during adjustment. Due to the size of the tubular portions 12,13,14, and the range of reach adjustment, small deviations from the ideal sizes of each portion due to manufacturing tolerances can introduce unwanted free play and in turn cause the telescopic motion to become non-linear.

The relative axial position of the three shroud portions 12,13,14 is set by a linear actuator. The linear actuator comprises three main parts: a motor 16, a reduction gearbox 17 a threaded rod 18. The motor 16 is connected to the threaded rod 18 through the gearbox 17 so that operation of the motor causes the rod to rotate around its long axis. As will be explained, the motor 16 is secured to the intermediate, second, shroud portion 13 and each end of the rod 18 is secured to a support bracket assembly 19,20 that is secured to a respective one of the first and third shroud portions. Rotation of the rod 18 in one direction drives these support brackets 19,20 towards each other and rotation of the rod 18 in the other direction drives these support brackets 19,20 away from each other. The motor therefore controls the overall length of the telescopic shroud.

Figure 6:
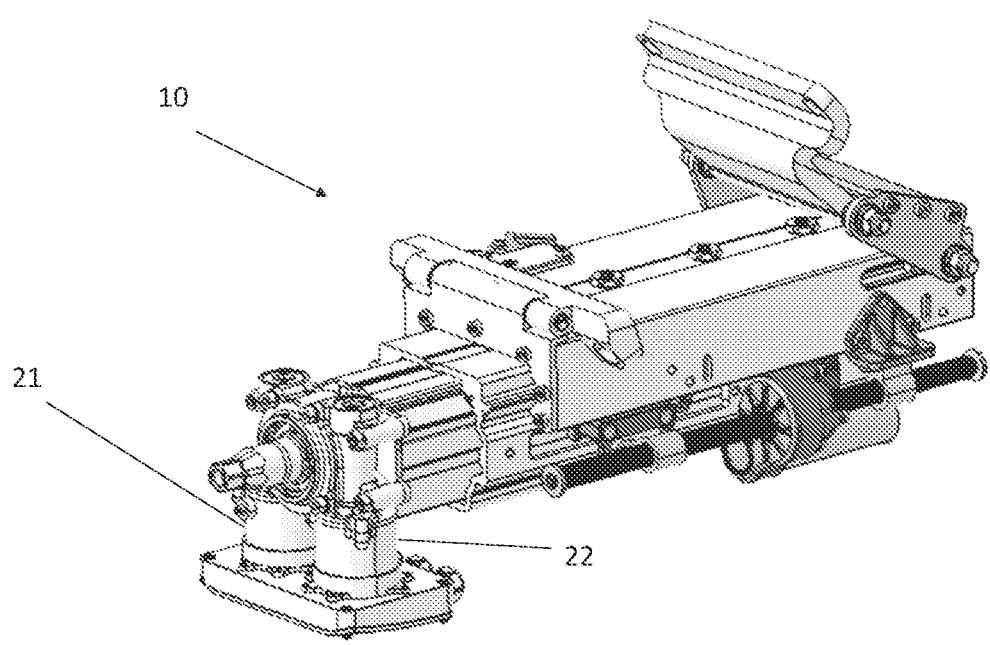
FIG. 6 is an isometric view of the handwheel actuator assembly fully extended.

As shown in FIG. 6, in this example the steering shaft 11 is connected to a pair of motors 21,22 through a gearbox assembly. The motors provide force feedback to the driver by acting upon the steering shaft in response to a demand signal.

Figure 5C:
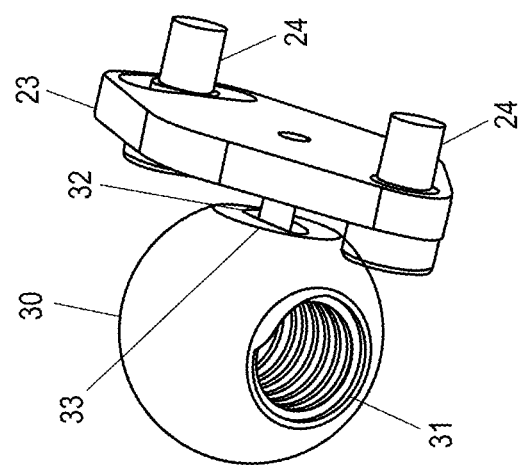
FIG. 5C is a cut away view of the internal parts of the first exemplary support bracket that may be used in the handwheel actuator of FIG. 4.
Figure 5B:
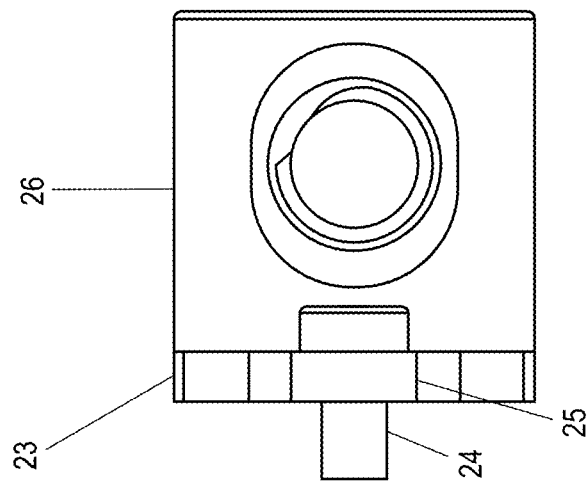
FIG. 5B is a frontal view looking along the axis of the rod of the linear actuator of the first exemplary support bracket that may be used in the handwheel actuator of FIG. 4.
Figure 5A:
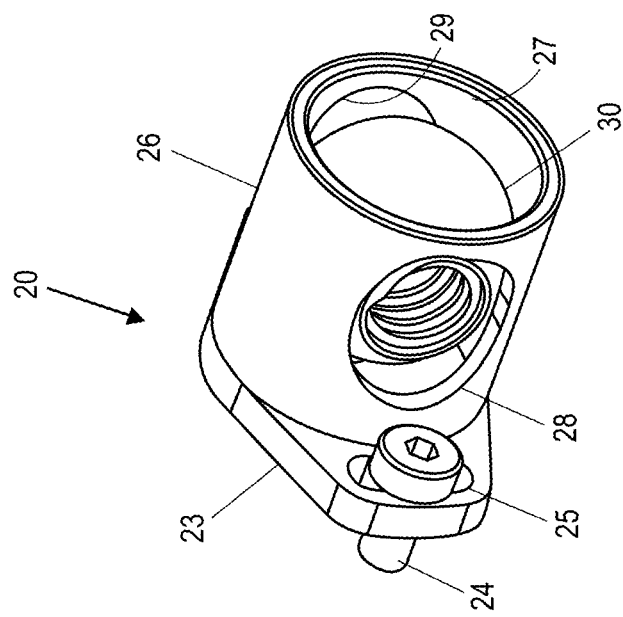
FIG. 5A is an isometric view of a first exemplary support bracket that may be used in the handwheel actuator of FIG. 4.

FIGS. 5A-5C show a first exemplary arrangements of a support bracket assembly as shown in the HWA of FIG. 4. The two support bracket assemblies 19,20 may be the same so only one is described here. An important feature of each of the support brackets 19,20 is to provide a degree of lost motion between the rod 18 of the linear actuator and the associated tubular shroud portion 12,14 to accommodate misalignment of the shroud portions during use of the steering column assembly that would otherwise apply a bending moment to the linear actuator.

The applicant has appreciated that it is important that the linear actuator does not present a significant variation in resistance of the whole column to a collapse. If the rod is bent then such a variation is very likely as the rod may bind within a simple support bracket assembly that cannot accommodate lost motion.

A first exemplary arrangement of a support bracket assembly 20 is shown in FIG. 5 and comprises a rigid mounting part 23 that is fixed to the associated shroud portion and a locating part 24 that is fixed to the mounting part 23 and that engages the elongate rod 18.

The rigid mounting part 23 comprises a base plate that is secured to the associated shroud part through a bolt 24 that extends through an elongate slot 25 in the base plate. The slot allows the rigid mounting 23 part to move vertically relative to the shroud. The base plate sits upon a complimentary vertical receiving surface of the side of the associated shroud portion such that the base plate may slide relative to the receiving surface. This allows any unwanted vertical offset of the shrouds due to manufacturing tolerances to be accommodated without placing a bending load on the rod of the linear actuator.

Extending from the base plate 23 is a cylindrical cage 26 which forms a part of the mounting part. As shown the base plate and cage 26 form a single unitary component. The cage 26 has a cylindrical inner bore 27 and two opposed cut outs 28,29 in the side wall of the cylinder that the elongate rod 18 passes through. The cage 26 receives a connector block in the form of a spherical ball 30 having a threaded through bore 31 that is threaded onto the rod 18 so that the ball 30 is held captive in the cage 26. The diameter of the ball 30 is complimentary to the inner diameter of the bore 27 of the cylindrical cage 26 so that the ball 30 can be freely slid into the cage.

A pin 32 is located at one end in the base plate and at the other in a complimentary bore 33 in the ball. This pin prevents rotation of the ball 30 around the axis of the threaded rod 18 but permits the ball 30 to translate horizontally within the cage 26. The range of horizontal motion is limited by the rod striking the cage so that the ball cannot slide out of the cage. The bore in the ball is elongated to allow some rotation of the ball around a vertical axis before the ball and pin bind with each other.

The support bracket assembly 20 therefore permits lost motion along the horizontal and vertical directions so that the rod will not become bent, and also rotation around the vertical and horizontal axes. The cage may restrain the connector block such that it cannot rotate around the axis of rotation of the rod.

Figure 7:
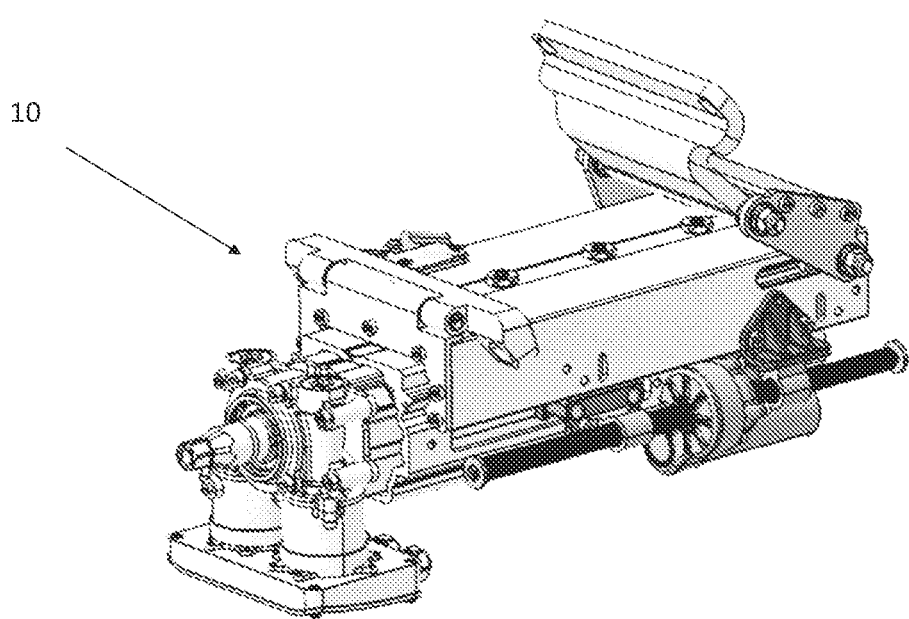
FIG. 7 is an isometric view of the handwheel actuator assembly fully retracted.
Figure 8B:
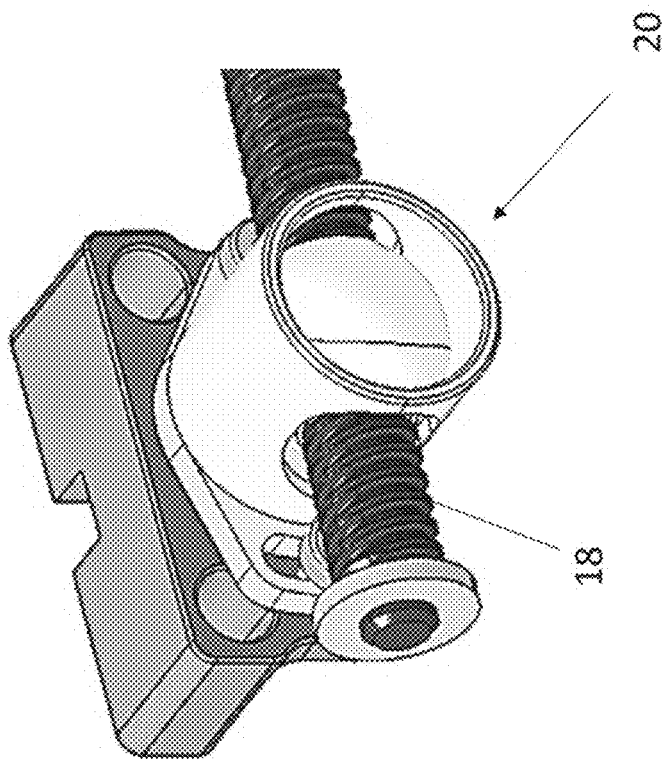
FIG. 8B shows the support bracket assembly accommodating different vertical, horizontal, and rotational alignment of the rod and the support brackets in the position on FIG. 7.
Figure 8A:
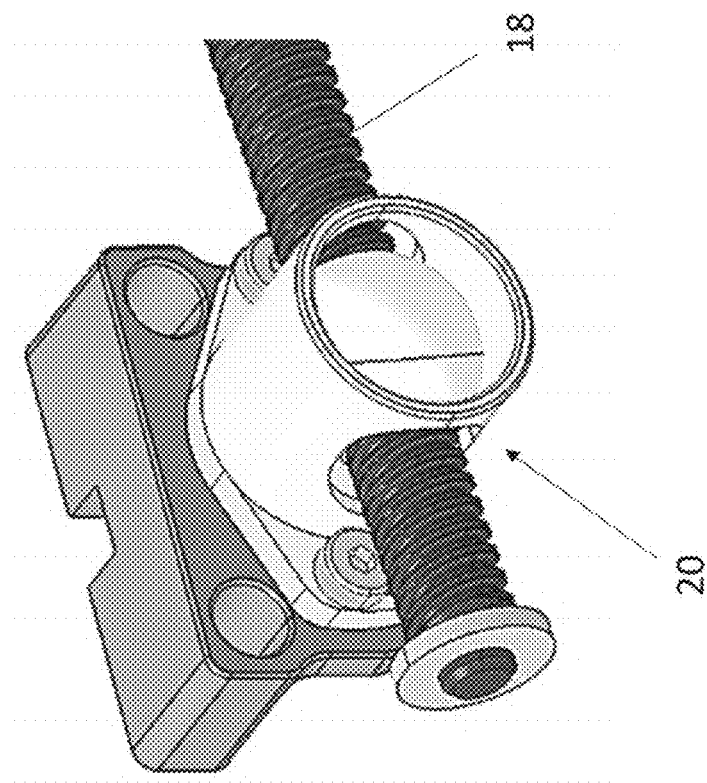
FIG. 8A shows the support bracket assembly accommodating different vertical, horizontal, and rotational alignment of the rod and the support brackets in the position on FIG. 6.

FIGS. 6 and 7 show how the shroud portions can be placed in different positions by operation of the motor of the linear actuator. FIGS. 8A and 8B show how the support bracket assemblies 20 can move to provide some lost motion as the rod 18 deviates for an ideal linear motion due to manufacturing tolerances in the shroud portions.

The arrangement of components allows movement in abovementioned directions, that may be big enough to compensate imperfections resulting from tolerance stack-up. Thanks to the presented disclosure, there is no over constraint, so the reach actuator shaft and transmission do not bend, even if the actuator axis is in offset to the column centreline.

FIGS. 9A-9C show a second exemplary support bracket assembly 40 which again has the rigid mounting part in the form of a base plate 41, a cage 42, and a ball shaped connector block 43 located in the cage 42. The cage 42 has two opposed openings 44 through which the elongate rod 18 passes and the ball has a through bore 45 with an internal thread that allows it to be threaded onto the rod. The rod therefore prevents the ball coming out of the cage.

The cage 42 is connected to the base portion through two serially connected parallelogram linkages that permits vertical movement and horizontal movement of the cage relative to the base portion. This allows the base plate to be secured rigidly to the shroud portion as it no longer needs to slide vertically. The linkages are formed from six link arms 46-51 and six interconnecting pivot pins 52-57.

One of the linkages is defined by two upper links 46,47 and two lower links 48,49, one end of each upper link fixed to the same end of the other by a pivot pin 52, and the other end of each upper link fixed to the cage 42 by a second pivot pin 53. The two lower links 48,49 are fixed in the same way by third and fourth pivot pins 54,55.

The two pins 52,55 nearest the base plate 41 are not connected to the base plate directly but pass through openings in an end of a respective fifth link 50 and sixth link 51. These two links 50,51 are connected at their opposite ends to the base plate 41 through two further pivot pins 56,57. Together these additional two links and pins form a second linkage.

To understand the lost motion provided by the two serial linkages consider first that the two pins 52,55 that connect the first linkage to the second linkage are fixed and cannot move but the two pins 53,54 at the other ends of the first linkage are free to move restrained by the pivoting of the links around the fixed pins. The cage interconnects both free ends of the links that are furthest from the base plate. Thus, the cage can move up and down constrained by the first linkage.

If we next allow the pins 52,55 that connect the first linkage to the second linkage to move in space constrained by the first and second linkages, it will be appreciated that the cage 42 can also move horizontally relative to the base plate as the orientation of all eight linkages changes.

Of course, the skilled person will appreciate that other linkages are possible within the scope of the present disclosure to provide the required degree of horizontal lost motion and vertical lost motion, or provide only for vertical or only horizontal lost motion.

The ball shaped connector block 43 can rotate around vertical and horizontal axes within the cage 42 as well as move through a limited range of horizontal motion orthogonal to the axis of the threaded rod 18 by a pin 58 that is part of the cage that engages an oversized bore 59 in the ball.

In a third exemplary support bracket assembly 60 shown in FIGS. 10A-10C, the support bracket assembly comprises a base plate 61 that can be rigidly fixed to a shroud portion through a pair of cut outs 62. The base plate 61 has a pair of arms 63, 64 that extend from a top and a bottom edge of the base plate 61 respectively horizontally away from the shroud portion. The free end of the two arms 63, 64 support a cage 65 in the form of a cylindrical band. Within the band 65 is a connector block in the form of a ball 66 that has a through bore that is threaded onto the rod 18 of the linear actuator. The cage 65 also includes two pins 67 that engage elongate slots in the ball 65 from opposite sides and an annular elastomeric damper 68 that fills the space between the outer surface of the ball 66 and the inner wall of the band 65.

The damper 68 controls movement of the ball 66 vertically and horizontally. The pins prevent rotation of the ball around the axis of the threaded rod by allow the ball to rotate around axes orthogonal to the rod. A small amount of horizontal movement is possible by making the pins 67 a loose fit in the slots in the ball 66.

A fourth exemplary support bracket assembly 70 is shown in FIGS. 11A-11D. The support bracket assembly 70 comprises a base plate 71 and a cylindrical cage 72 that extends from the base plate 71. The axis of the cylindrical cage 72 is orthogonal to the axis of the threaded rod 18 of the linear actuator when the base plate is fixed to a shroud portion. Opposing sides of the cage 72 have openings 73 through with the rod 18 can pass and these are elongated horizontally to allow the rod 18 to move horizontally relative to the support bracket.

The cage 72 locates a cylindrical connector block 73 that has a threaded through bore 74 that engages the rod 18. This connector block 73 has a smaller diameter than the inside of the cylindrical cage and comprises an inner solid cylindrical member 74 surrounded by a cylindrical metal sleeve 75 is in the annular space between the member 74 and the cage 72. Between the sleeves 75 and the member 74 is a resilient annular spacer block 76 that is keyed to both the connector block and the sleeve 75. To prevent rotation of the connector block 73 around the axis of the rod 18 the block 73 is retained at one end by a locating lug 77 formed into the base plate 71 and a locating lug 78 formed into an end cap 79 that is fixed to the end of the cage 72 furthest from the base plate.

As shown in FIGS. 12A-12D, a fifth exemplary support bracket assembly 80 comprises a base plate 81 and four orthogonal walls 82,83,84,85 that extend away from the base 81 plate to define a cubic volume of space between the walls. Two of the walls 83,84 are vertical and have openings through which the elongate rod passes. The other two walls are horizontal and define a top wall and a bottom wall of the cubic volume of space.

Each of the vertical walls 83,84 supports a respective annular bearing 86,87 and these in turn surround the rod 18, the bearings 86,87 also providing a support for a ball shaped connector block 88. The walls and bearings together form a cage and the base plate a rigid mounting portion. The bearings 86,87 permit the ball to rotate around a vertical and a horizontal axis and can each slide relative to the vertical walls to provide for horizontal or vertical translation of the ball. A pin 89 located in a slot not shown in the base plate 81 connects the ball 88 to the base plate 81 to prevent the ball rotating around the axis of the threaded rod 18.

As shown in FIGS. 13A-13D, a sixth exemplary support bracket assembly 90 comprises a base plate 91 and four orthogonal walls 92,93,94,95 that extend away from the base plate to define a cubic volume of space between the walls. Two of the walls are vertical and have openings through which the elongate rod passes. The other two walls are horizontal and define a top wall and a bottom wall of the cubic volume of space.

Each of the vertical walls supports an annular bearing 96,97 that surrounds the rod 18, the bearings providing a support for a cylindrical shaped connector block 98. The walls and bearings together form a cage and the base plate 91 a rigid mounting portion. The bearings permit the cylinder to slide relative to the vertical walls to provide for horizontal or vertical translation of the cylinder. Rotational movement can be permitted by making the annular bearings from a resilient material, such as an elastomer. A pin 99 connects the connector to the base plate to prevent the ball rotating around the axis of the threaded rod.

This example is similar to that of FIGS. 12A-12D. As shown in FIGS. 13A-13D it differs in the use of a cylinder shape connector block rather than a ball shaped connector block. As such the connector block cannot rotate around the horizontal and vertical axes like the ball in FIGS. 12A-12D, but the horizontal and vertical translation is still accommodated.

The invention claimed is:

1. A steer by wire steering column assembly for a vehicle comprising:
a shroud having a first shroud portion and a second shroud portion, the first shroud portion and the second shroud portion being constrained to move telescopically relative to one another for adjustment of a reach position of a steering column assembly;
a shaft supported by one or more bearing assemblies housed within the shroud and adapted for supporting a handwheel or another user operable device at a free end; and
a linear actuator that includes an elongate threaded rod that is connected at a first location to one of the shroud portions by a first bracket assembly and at a second location to the other shroud portion by a second bracket assembly, the linear actuator controlling a telescopic position of the shroud by causing the threaded rod to rotate around its axis,
wherein at least one of the first and second bracket assemblies is adapted to provide a degree of lost motion between the linear actuator and one of the first and second shroud portions that accommodates misalignment of the first and second shroud portions during use of the steering column assembly that would otherwise apply a bending moment to the linear actuator, and
wherein each bracket assembly comprises a rigid mounting part that is fixed to one of the first and second shroud portions and a locating part that is fixed to the rigid mounting part and that engages the elongate threaded rod, wherein at least a portion of the lost motion is provided between either or both;
the mounting bracket and the first and second shroud portions to which the mounting bracket is fixed; and
the locating part and the mounting bracket.

2. A steering column assembly according to claim 1, wherein the first bracket assembly is arranged to provide free movement between one of the first and second shroud portions to which it is connected and the linear actuator with little to no opposing force in one or more of the following directions:
horizontally;
vertically;
rotationally around a horizontal axis; and
rotationally around a vertical axis.

3. A steering column assembly according to claim 1, wherein the rigid mounting part is secured to one of the first and second shroud portions through a fastener that extends through an elongate slot in the rigid mounting part that allows the rigid mounting part to move vertically relative to one of the first and second shroud portions to which it is connected.

4. A steering column assembly according to claim 3, wherein the locating part of the bracket assembly comprises a cage that is secured to the rigid mounting part and a connector block that is retained within the cage and which engages the elongated threaded rod of the linear actuator, the cage permitting limited translation or rotation of the connector block relative to the cage, wherein at least a portion the lost motion is provided between either or both of: the cage and the mounting bracket; and the cage and the connector block, optionally wherein the connector block is free to slide in a generally horizontal direction through a limited range of motion within the cage.

5. A steering column assembly according to claim 1, wherein the locating part of the bracket assembly comprises a cage that is secured to the rigid mounting part and a connector block that is retained within the cage and which engages the elongated threaded rod of the linear actuator, the cage permitting limited translation or rotation of the connector block relative to the cage, wherein at least a portion the lost motion is provided between either or both of: the cage and the mounting bracket;
and the cage and the connector block, optionally wherein the connector block is free to slide in a generally horizontal direction through a limited range of motion within the cage.

6. A steering column assembly according to claim 5, wherein the connector block includes a through bore that receives the elongated threaded rod, optionally wherein the through bore has an internal thread that engages a thread of the elongated threaded rod.

7. A steering column assembly according to claim 6, wherein the cage restrains the connector block such that it cannot rotate around an axis of rotation of the elongated threaded rod thereby enabling the length of the shroud to be adjusted by rotation of the elongated threaded rod along its axis, optionally wherein a pin is provided that links the connector block to the cage or to another part of the rigid mounting part thereby preventing rotational movement of the mounting part relative to the elongated threaded rod around an axis of rotation of the elongated threaded rod and the connector block.

8. A steering column assembly according to claim 6, wherein the connector block is free to rotate within the cage around an axis perpendicular to an axis of the elongate threaded rod, optionally wherein the connector block is rotatable around both mutually orthogonal axes.

9. A steering column assembly according to claim 5, wherein the connector block is free to rotate within the cage around an axis perpendicular to an axis of the elongate threaded rod, optionally wherein the connector block is rotatable around both mutually orthogonal axes.

10. A steering column assembly according to claim 9, wherein the connector block is free to slide along the pin over a limited range of motion.

11. A steering column assembly according to claim 5, wherein the cage comprises a cylinder having a central bore that locates the connector block.

12. A steering column assembly according to claim 5, wherein the cage is rigidly secured to the rigid mounting part, optionally wherein the cage and the mounting part are a single unitary component.

13. A steering column assembly according to claim 5, wherein the cage is be secured to the rigid mounting part through at least a linkage that permits relative motion between the cage and the mounting part, optionally wherein the linkage comprises two link arms that are arranged as a parallelogram enabling the cage to move vertically up and down relative to the rigid mounting part.

14. A steering column assembly according to claim 5, wherein the connector block is slidingly fixed to the cage through one or more plain bearings optionally wherein the bracket assembly further includes at least one damping element, that acts between the cage and the connector block to damp motion between the two parts and to provide some self-centring.

15. A steering column assembly according to claim 5, wherein the cage comprises a cylinder having a central bore that locates the connector block, wherein the block is a ball and the outer diameter of the ball is complimentary to the inner diameter of the cylinder, the inner diameter of the cylinder being greater than the ball to ensure rotation of the ball is permitted in the cylinder, the cylinder further including openings through which the elongated threaded rod of the linear actuator protrudes, the openings limiting the range of motion of the ball within the cylinder.

16. A steering column assembly according to claim 1, wherein the linear actuator comprises a motor that has a worm gear on an output shaft and is connected to the rod of the linear actuator through a wheel gear.

17. A steering column assembly according to claim 16, wherein the shroud additionally comprises a third shroud portion that is located intermediate the first and second shroud portions and the motor is secured to the third shroud portion, the first and second bracket assemblies being connected respectively to an associated one of the other first and second shroud portions.

18. A handwheel actuator assembly comprising a column assembly according to claim 1 that includes an electric motor that is connected to the steering shaft through a gearbox to provide force feedback to a user through the steering shaft.

19. A handwheel actuator assembly according to claim 18, comprising an electronic control and drive circuit that controls and drives the electric motor in response to a force feedback demand signal and an angular position sensor that determines the angular position of the steering shaft relative to the first tubular member.

* * * * *